United States Patent [19]

Hou

[11] Patent Number: 4,907,871
[45] Date of Patent: Mar. 13, 1990

[54] TELESCOPIC EXTERIOR REAR VIEW MIRROR

[76] Inventor: Mei-Wen H. Hou, No. 24, Lane 103, Kun Shan St., Ku Shan Tsun, Yung Kang Hsiang, Tainan, Taiwan

[21] Appl. No.: 378,980
[22] Filed: Jul. 12, 1989
[51] Int. Cl.[4] .......................... B60R 1/06; G02B 5/08
[52] U.S. Cl. .................................. 350/639; 350/604; 350/626; 248/478; 248/480
[58] Field of Search ............... 350/604, 606, 625, 626, 350/639; 248/476, 477, 478, 480

[56] References Cited

U.S. PATENT DOCUMENTS

| 3,954,328 | 5/1976 | Ames | 350/626 |
| 4,637,694 | 1/1987 | Castaneda | 350/626 |

FOREIGN PATENT DOCUMENTS

| 2845446 | 4/1980 | Fed. Rep. of Germany | 350/626 |
| 0145039 | 11/1980 | Japan | 350/626 |
| 0004440 | 1/1982 | Japan | 350/604 |

Primary Examiner—Bruce Y. Arnold
Assistant Examiner—R. D. Shafer
Attorney, Agent, or Firm—Morton J. Rosenberg; David I. Klein

[57] ABSTRACT

A telescopic exterior rear-view mirror for motor vehicles which comprises a first side mirror device having an inner chamber and a second side mirror adapted to move laterally outwardly from a retracted position in the chamber of the first side mirror device into an extended position in a telescopic fashion, a spring disposed between adjacent side walls of the first side mirror device and the second side mirror device for expelling the second side mirror device from the retracted position into the extended position and a lock and release means for locking the second side mirror device in the retracted position and operating to release the second side mirror device therefrom.

2 Claims, 5 Drawing Sheets

TELESCOPIC EXTERIOR REAR VIEW MIRROR

BACKGROUND OF THE INVENTION

This invention relates to a driving motor for a motorcar, and more particularly to a telescopic exterior rear-view mirror.

Nowadays travelling with a car towing a camper or mobile home for staying overnights is popular. Said car usually needs extra side mirrors such as exterior rear-view mirrors to enable the driver to see what is behind his car because original driving mirrors are entirely shaded by the trailer. Each of said extra exterior rear-view mirror usually includes a pyramid steel frame 7 laterally mounted on an upper portion of a fender and a mirror 8 facing rearwardly and adjustably secured to the top end of the frame 7. It is found disadvantageous that installations of the extra exterior rear-view mirrors laterally increase size of the car that becomes inconvenient or even impossible for parking the car in its garage, thus the extra exterior rear-view mirrors should be removed after disconnection with its trailer for security reason.

SUMMARY OF THE INVENTION

It is, therefore, an object of this invention to obviate such prior art disadvantages by providing telescopic exterior rear-view mirrors being arranged to rest against the respective front side panels of a motor vehicle in a usual way for selective usuages mainly according to connection or disconnection with a trailer.

This and other objects, such as will be apparent hereinafter, are achieved by a telescopic exterior rear-view mirror according to the characterizing clause of the appended claims.

DETAILED DESCRIPTION OF A PREFERRED EMBODIMENT

Figure 1:
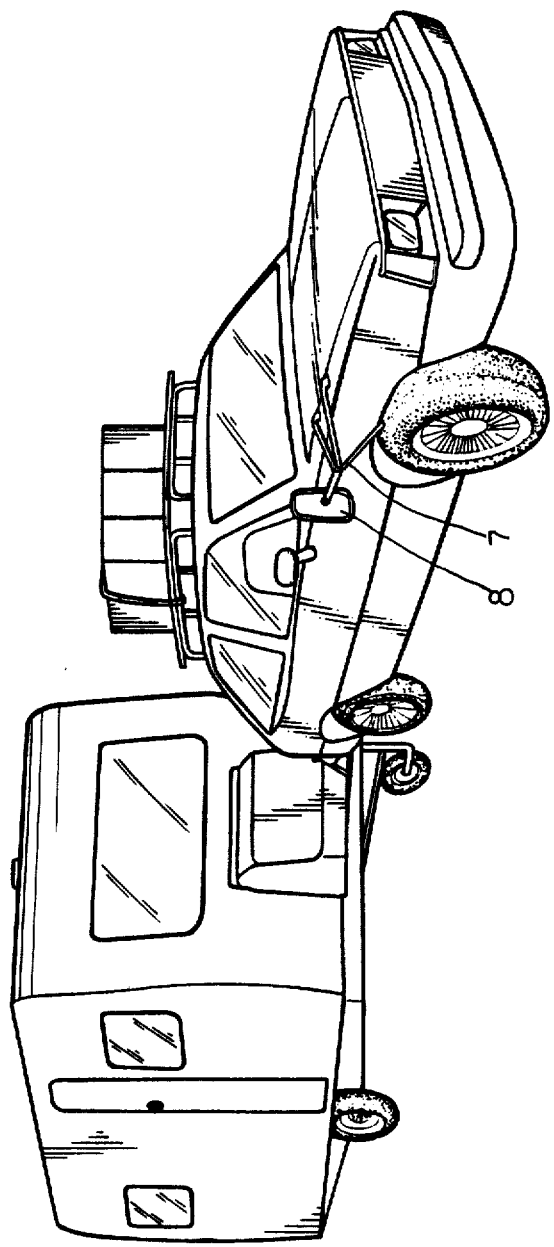
FIG. 1 is a perspective view showing a conventional extra exterior rear-view mirror mounted on a car which is towing a home mobile.
Figure 2:
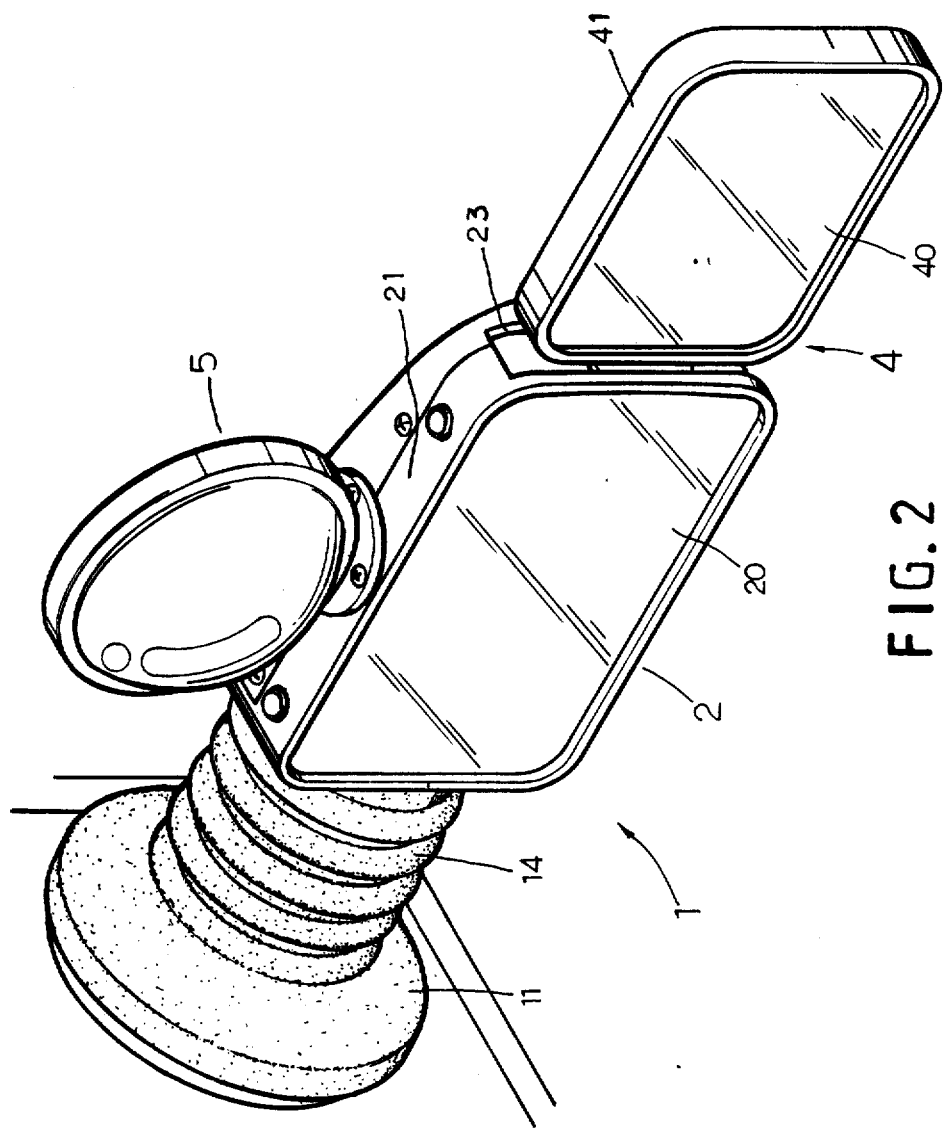
FIG. 2 is a perspective view of a preferred embodiment of this invention which is in assembled and extended condition.
Figure 3:
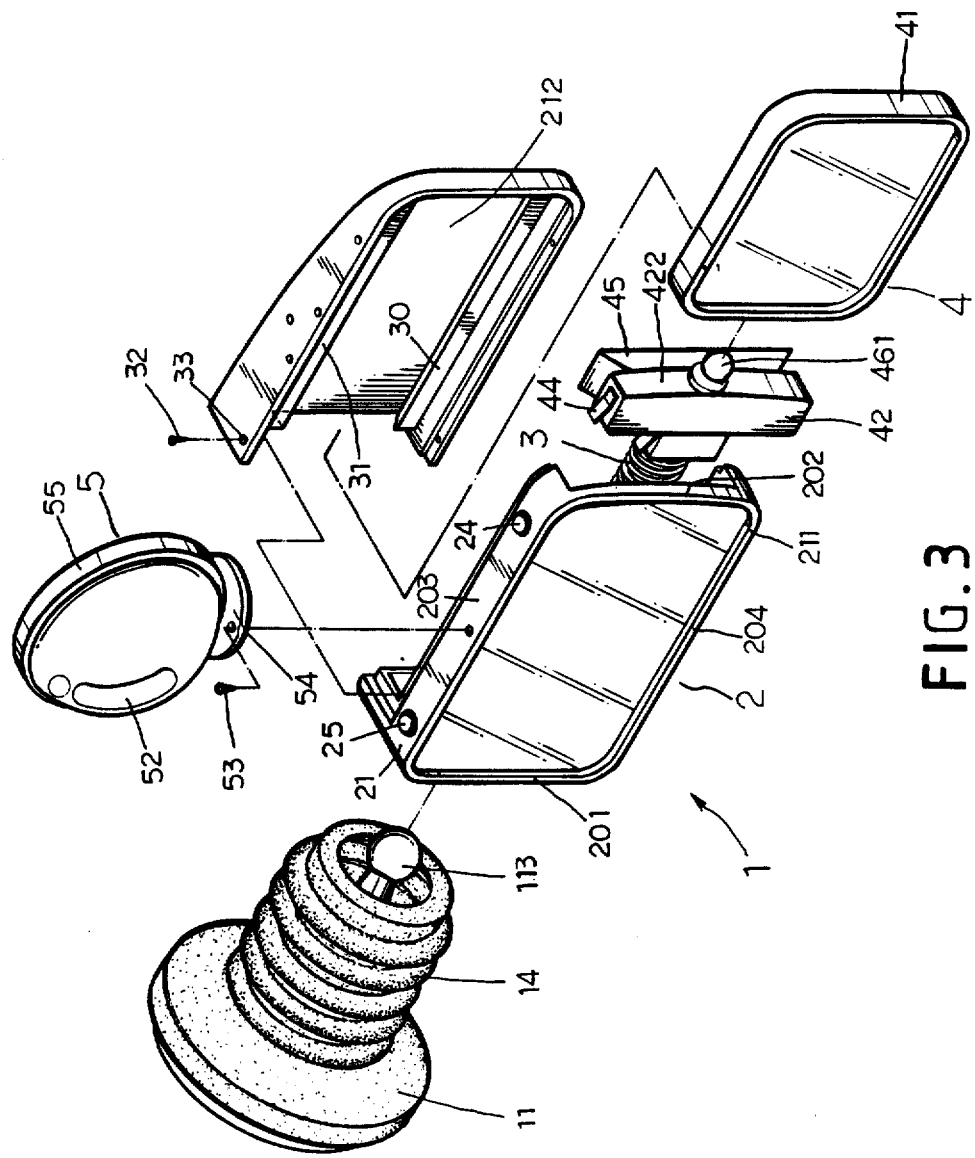
FIG. 3 is a perspective and exploded view of the exterior rear-view mirror.
Figures 4, 6:
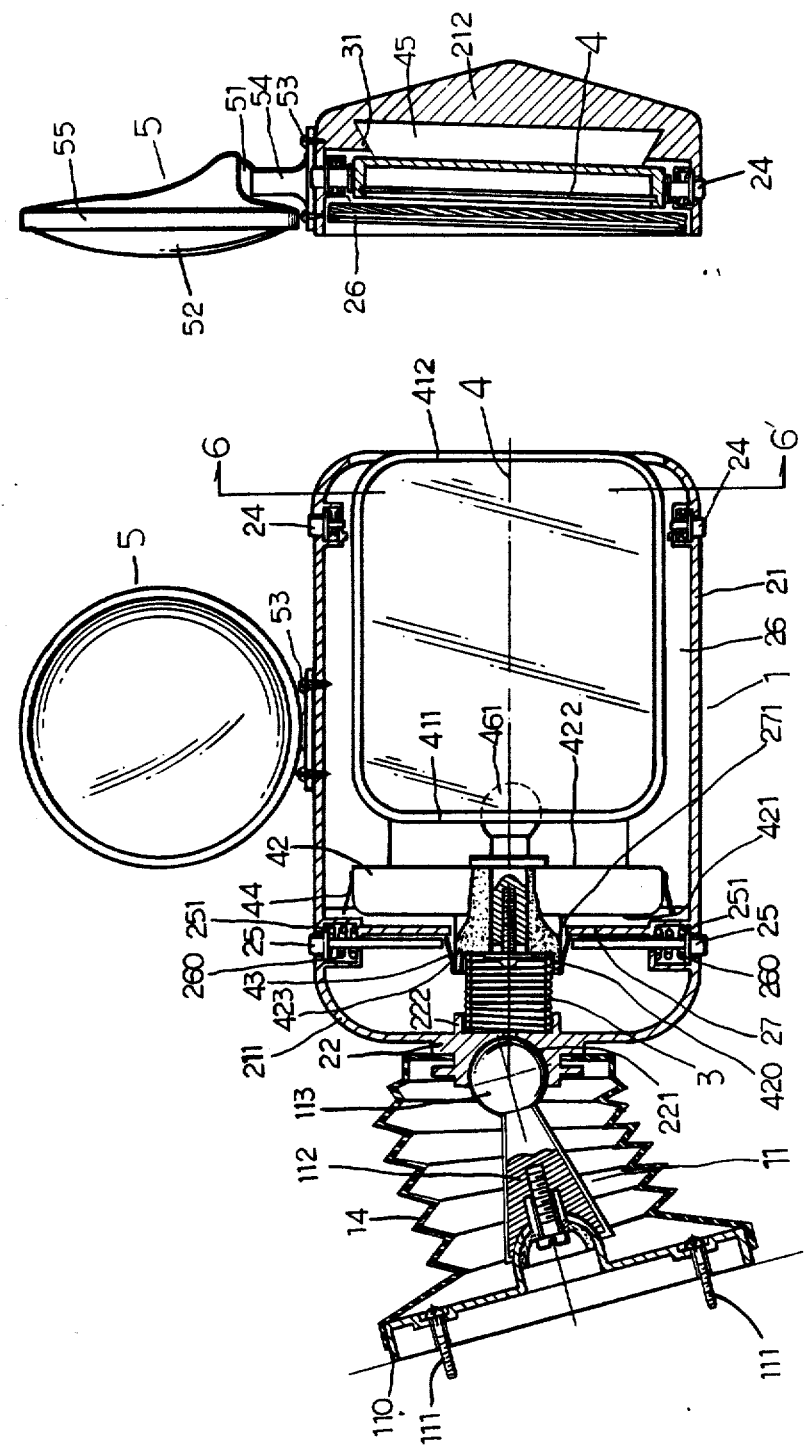
FIG. 4 is a transversely cross-sectional view of the exterior rear-view mirror which is in collapsed condition.
FIG. 6 is a cross-sectional view along line 6—6' in FIG. 4.
Figure 5:
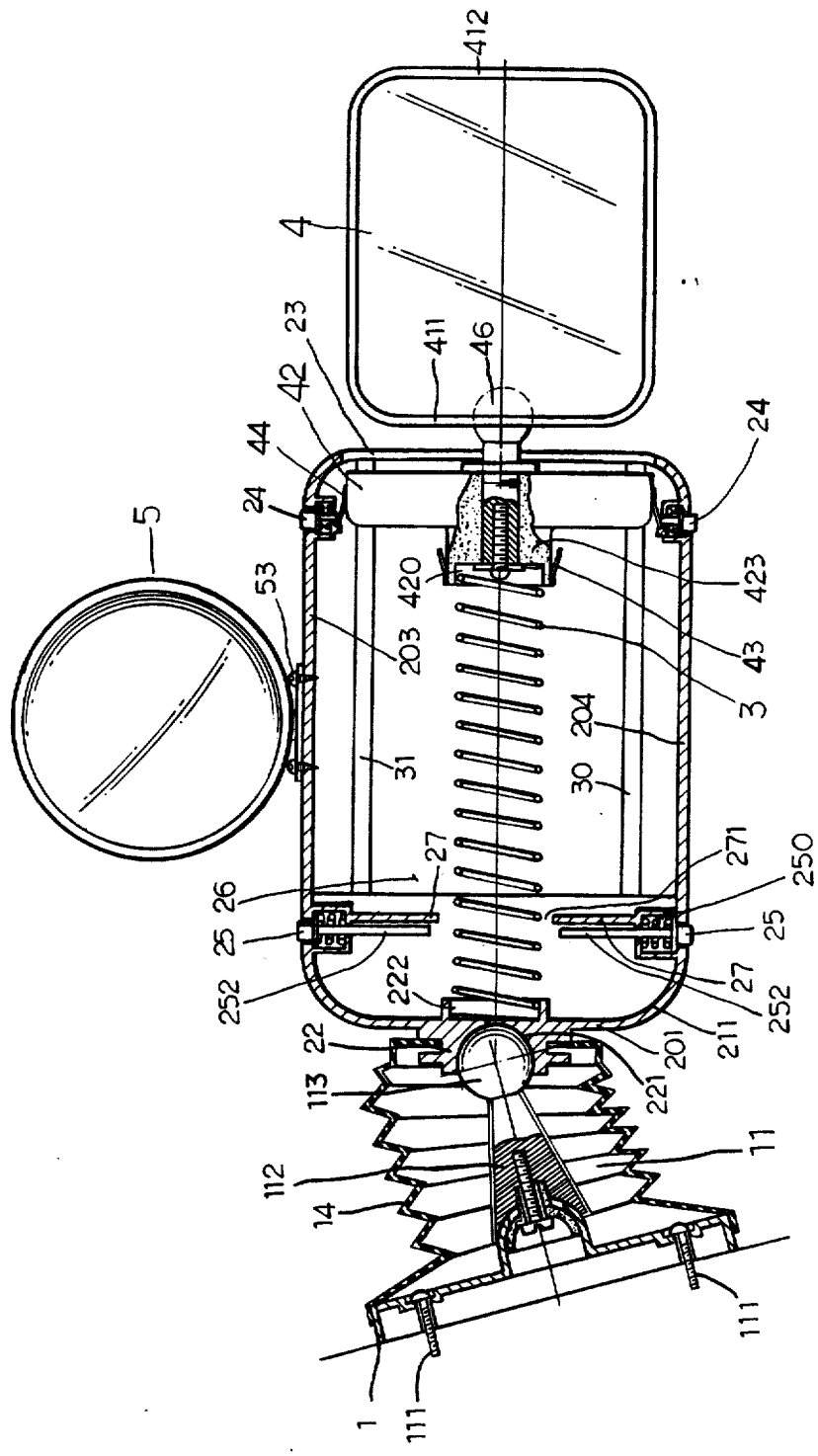
FIG. 5 is a transversely cross-sectional view of the exterior rear-view mirror which is in extended condition.

In FIG. 2, a telescopic exterior rear-view mirror 1 is arranged to rest against the front side panel of a motor vehicle. The telescopic exterior rear-view mirror 1 consists essentially of a mirror foot 11, a first side mirror 2 having a first housing 21 carrying a first mirror 20 facing rearwardly, a second side mirror 4 having a second housing 41 carrying a second mirror 40 facing rearwardly and adapted to move within the first side mirror 2 in a telescopic fashion through a side opening 23 formed in a side wall of the first housing 21 and a convex mirror 5 mounted on a top portion of the first side mirror divice 2.

Referring to FIGS. 3, 4, 5 and 6, the mirror foot 11 includes a stand 110 secured to the body of the car by means of screws 111 and a cone-shaped bar 112 having a ball 113 on the apex.

The first side mirror device 2 is laterally and adjustably connected to the mirror foot 11 through a conventional ball joint assembly, which, in this application, comprises a concave recess 221 formed in a side wall body 22 of the first housing 21, and said ball 113, on the apex of the bar 112, relatively rotatably received in the concave recess 221.

A corrugated sleeve member 14 is mounted around the mirror foot 11 and disposed between the stand 110 and the side wall body 22 of the first housing 21 for preventing the mirror foot 11, especially the ball joint assembly, from weather or dust.

The first housing 21 includes a frame member 211 substantially rectangular in configuration having a pair of parallel vertical side walls 201, 202 and a pair of parallel horizontal side walls 203, 204 and with the opening 23 formed in a side wall 202 opposed to the side wall 201 having the side wall body 22 and a streamlined cover 212 for covering another opening opposite to the mirror 20 carried therein so as to define a chamber 26. The cover 212 is further secured to the frame member 211 by means of screw 32 and screw hole 33.

A pair of V-shaped rails 30, 31 is transversly secured to the inner side wall of the cover 212.

The second side mirror device 4 is laterally and adjustably connected to an intermediate body 42, which has a lagging side 421, a leading side 422, a slide body 45 firmly attached to a vertical side wall thereof and slidably mounted on the rails 30, 31, through another conventional ball joint assembly 46. Said slide body 45 allows the second mirror device 4 to be moved between a retracted position in the chamber 26 and an extended position.

The second housing 41 of the second side mirror device 4 is substantially rectangular in configuration, having a pair of parallel vertical side walls of a lagging side wall 411 and a leading side wall 412, yet smaller than the first housing 21 in size. A pair of opposed recesses 420, 222 are respectively formed in a projection body 423 externally located on the lagging side 421 of the intermediate body 42 and an inner portion of the side wall 201 of the frame member 211 for retaining two end portions of a helical spring 3.

The ball joint assembly 46 consists of a ball 461 formed on a mid portion of the leading side 422 of the intermediate body 42 and an opening (not shown) formed in the lagging side wall 411 of the second housing 41 and adapted to rotatably receive the ball 461.

A pair of control devices further provided in the end portions of the first housing 21. A control device 25 provided for releasing the second side mirror device 4 from its retracted position to extend, for example, includes a pair of press buttons 25 which respectively have flanges 251 fitted in spring chambers 250 opposedly secured to inner side walls of the parallel horizontal side walls 203, 204, actuating rods 252 extending vertically and inwardly, helical springs 260 mounted around portions located in the spring chambers 250 of the actuating rod 252 and each disposed between a bottom of the spring chamber 250 and the flange 251 of the press button 25 in the spring chamber 250. A partition board 27 vertically mounted across the chamber 26 and having an opening 271 formed in the central portion and allowing the projection body 423 to pass therethrough. The projection body 423 further includes a pair of spaced-apart, resiliently-deformable, projections such as spring plates 43 extending outwardly from both edges of the body 423. The outer ends of the spring plates 43 are normally positioned beyond the passage 271 of the partition board 27. In release operation, the press buttons 25 are pressed with fingers to move inwardly to press the outer ends of the spring plates 43 which will deform substantially in a parallel arrangement that release the second mirror device 4 from the retracted position to be expelled transversely into the extended position by means of the compressed spring 3.

Another control device 24 having a pair of check spring plates 44 are provided for releasing the second mirror device 4 from its extended position to be retracted by pushing to compress the spring. The control device 24 is similar both in construction and operation to the control device 25.

The convex mirror 5 is mounted on a top portion of the first housing 21 by means of screws 53. The mirror set 5 includes a stand 54 and a mirror frame 55 carrying a convex mirror 52 normally facing rearwardly and adjustably connected to the stand 54 through a conventional ball joint assembly 51. The convex mirror set 5 is an effective auxiliary enabling the driver to see what is behind in a wider range. Moreover, the mirror set 5 can easily be adjusted to see the loading condition such as baggages or the like loaded on the roof of the car during driving.

It is obviously convenient that a second mirror can be expelled outwardly and laterally from the exterior rearview mirror according to the present invention when a car is attached with a mobile home and can be restored in the mirror device when the mobile home is no longer attached with the car.

I claim:

1. A telescopic exterior rear-view mirror for motor vehicles comprising:
   a first side mirror device having a housing carrying a first mirror and having a first side wall, a second side wall opposed to the first side wall having an opening and said housing having an inner chamber;
   secure means for securing the housing to the body of the motor vehicle;
   a first ball joint connector rotatably and adjustably interconnecting the secure means and the first side wall of the housing;
   rail means transversely arranged in the housing;
   a second side mirror device having a frame member carrying a second mirror facing a direction substantially corresponding to that of the first mirror, adapted to be stored in the chamber of the housing of the first side mirror device, having a lagging side wall and leading side wall respectively corresponding to the first side wall and the second side wall of the housing and movable between a retracted position in the housing and an extended position through the opening in the second side wall of the housing;
   an intermediate body having a lagging side and a leading side respectively corresponding to the lagging side wall and leading side wall of the frame member of the second side mirror device;
   a second ball joint assembly connector rotatably and adjustably interconnecting the leading side of the intermediate body and the lagging side wall of the frame member of the second side mirror device;
   a slide member engaged in the rail means of said housing and attached to the intermediate body for sliding the second side mirror device between a retracted position and an extended position;
   a spring unit disposed between the first side wall of the housing and the lagging side of the intermediate body for expelling the second side mirror device from the retracted position into the extended position;
   a pair of retaining members opposedly formed on the first side wall of the housing and the lagging side of the intermediate body and having respective recesses for retaining the end portions of the spring unit; and
   a lock and release means having a portion board extending across the parallel horizontal side walls of the housing and having a passage formed in a central portion thereof, a spring plate located along a longitudinal edge of the retaining member on the lagging side of the intermediate body frame member and extending outwardly in a direction generally parallel to the partition board, with a free end portion of the spring plate normally positioned beyond the passage of said partition board to lock the second side mirror device in the retracted position and an actuating rod means having an actuating rod pointing inwardly in a direction generally parallel to the partition board with an end adjacent to the free end of the spring and when actuated, said rod moves inwardly to depress the free end of the spring to release the second mirror device from the retracted position.

2. A telescopic exterior rear-view mirror for motor vehicles as claimed in claim 1 wherein a convex mirror is further mounted on the top portion of said housing of said first side mirror device, which includes a stand secured to the housing and a mirror frame carrying a convex mirror and adjustably connected to the stand through a third ball joint assembly.

* * * * *